US012420427B1

(12) United States Patent
Conte et al.

(10) Patent No.: US 12,420,427 B1
(45) Date of Patent: Sep. 23, 2025

(54) ROBOTIC SYSTEMS AND METHODS FOR OBJECTIVELY EVALUATING COATING COMPOSITIONS AND APPLICATORS

(71) Applicant: SWIMC LLC, Cleveland, OH (US)

(72) Inventors: Stacy L. Conte, Bath Township, OH (US); Mark A. Schubert, Broadview Heights, OH (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 18/904,470

(22) Filed: Oct. 2, 2024

Related U.S. Application Data

(60) Provisional application No. 63/587,834, filed on Oct. 4, 2023.

(51) Int. Cl.
*B25J 11/00* (2006.01)
*B05B 12/08* (2006.01)
*B05C 11/00* (2006.01)
*B05C 11/10* (2006.01)

(52) U.S. Cl.
CPC ......... *B25J 11/0075* (2013.01); *B05B 12/084* (2013.01); *B05C 11/1005* (2013.01)

(58) Field of Classification Search
USPC ....... 118/323, 321, 256, 263, 264, 712, 713, 118/695–697, 679–682
See application file for complete search history.

(56) References Cited

U.S. PATENT DOCUMENTS

| 5,271,953 A * | 12/1993 | Litteral | H05K 3/0091 118/704 |
| 10,303,842 B2 | 5/2019 | Vaynberg et al. | |
| 2018/0078914 A1 * | 3/2018 | Lewis | B01F 33/85 |
| 2018/0283016 A1 * | 10/2018 | Telleria | B24B 49/12 |

FOREIGN PATENT DOCUMENTS

| WO | WO-2022084099 A1 * | 4/2022 | ........... B05B 12/084 |
| WO | WO-2023001691 A1 * | 1/2023 | ........... B05B 12/084 |

OTHER PUBLICATIONS

English Translation WO-2022084099-A1 (Year: 2022).*
Bansal, Karan et al., Robotic painting: mimicking human applicators, J. Coat. Technol. Res., Apr. 26, 2022, pp. 1369-1381, https://doi.org/10.1007/s11998-022-00750-7.
Vaynberg, K. Abraham et al., Understanding Consumer Preferences for Architectural Paints Using Application Reader Technology (ART) Device, Coatings Tech, May 2016, paint.org.

* cited by examiner

*Primary Examiner* — Yewebdar T Tadesse

(57) ABSTRACT

A system for deriving quantitative application characteristics of a coating composition or applicator independent of human application variation. The system comprises a test bed, a substrate, a rigid frame, a torque or force sensor coupled to an extender with a coating composition applicator, a controller, and an analyzer. The controller directs the extender to apply the coating composition to the substrate or test bed by moving according to a pre-programmed movement routine. The analyzer uses data recorded from the sensor to determine quantitative application characteristics of the coating composition or applicator.

21 Claims, 6 Drawing Sheets

| Test ID | Coating Composition Formula | Applicator ID | Variable | Quantitative Coating Characteristic ID | Value | Quantitative Coating Characteristic ID | Value |
|---|---|---|---|---|---|---|---|
| 710a | SW1006-410 | 42 | 0.1 wt.% Material 1076 | wet hide | 1.2 | spatter | 3.4 |
| 710b | SW1006-410 | 42 | 0.15 wt.% Material 1077 | wet hide | 1.5 | Spatter | 3.46 |
| 710c | SW1006-410 | 43 | 0.16 wt.% Material 1097 | wet hide | 1.8 | spatter | 3.21 |
| 711a | SW1008-440 | 46 | 2.02% Material 4324 | PVC | 40 | Roller Resistance | 4.1 |
| 711b | SW1008-440 | 47 | 2.02% Material 4325 | PVC | 40.2 | Roller Resistance | 6.5 |
| 711c | SW1008-440 | 48 | 2.02% Material 4326 | PVC | 39.4 | Roller Resistance | 7.6 |

FIG.6

ROBOTIC SYSTEMS AND METHODS FOR OBJECTIVELY EVALUATING COATING COMPOSITIONS AND APPLICATORS

REFERENCE TO PRIOR APPLICATIONS

This application claims priority to U.S. Provisional Patent Application No. 63/587,834, filed on Oct. 4, 2023, the entirety of which is incorporated by reference.

TECHNICAL FIELD

The present invention relates to systems and methods for objectively evaluating coating compositions and/or applicators of coating compositions.

BACKGROUND

Traditionally, application of coating compositions is performed by an individual who applies the coating composition by applicator, such as roller, brush, or sprayer. After application, the user may assess the application characteristics on a numerical scale, 1 through 5, or 1 through 10, for example, which can allow for comparison between different coating compositions, different applicators, different application circumstances, or combinations thereof. However, such a system may introduce subjectivity based on the individual user, changes in the user's application over time, variations in user's application based on characteristics of the coating composition (e.g., viscosity, weight), or user fatigue, for example. Therefore, a need exists for a system to allow an evaluation and comparison of coating compositions and/or applicators in an objective and repeatable manner, independent of user impact.

SUMMARY

The following is a summary of this disclosure to provide a basic understanding of some aspects. This summary is intended to neither identify key or critical elements nor define any limitations of embodiments or claims. This summary may provide a simplified overview of some aspects that may be described in greater detail in other portions of this disclosure. Furthermore, any of the described aspects may be isolated or combined with other described aspects without limitation to the same effect as if they had been described separately and in every possible combination explicitly.

According to one aspect of the present invention, disclosed is system for objectively quantifying coating composition or coating applicator properties, the system comprising a test bed to which a coating composition is applied, a controlled sensing arm including an extender coupled to a coating composition applicator, and a sensor capable of measuring force, torque, or combinations thereof, the sensor coupled to the extender and the coating composition applicator, wherein the extender is configured to apply a coating composition to the test bed, using the coating composition applicator according to a pre-programmed movement routine for the controlled sensing arm; and a controller to direct the extender to move and apply the coating composition to the test bed according to the pre-programmed movement having a processor and memory, the controller coupled to the extender routine; and a rigid frame connecting the test bed and the controlled sensing arm; and an analyzer coupled to the sensor and the controller, the analyzer including at least a processor and memory and configured to record data from the sensor and data from the controller, and optionally, other data, and derive quantitative application characteristics of the coating composition, the coating composition applicator, or both, and subjective quality criteria, wherein the quantitative application characteristics are independent of human application variation and subjective quality criteria; and wherein the quantitative application characteristics are suitable for objective comparison of coating compositions, coating composition applicators, or both.

The system of the present disclosure may include one or more optional aspects which may be combined with the system individually or in combination. In some aspects, the quantitative application characteristic includes force during application, drag of the coating composition applicator, rolling resistance of the coating composition applicator, weight per area of the coating composition applied to the substrate or test bed, amount of coating composition applied to the substrate or test bed, square feet per gallon of coating composition applied, wet film thickness, dry film thickness, unloading efficiency, spatter, dry volume, wet volume.

The controlled sensing arm of the system in some aspects may include a tachometer coupled to the coating composition applicator.

The quantitative application characteristics in some aspects may include revolutions of the coating composition applicator per length of a movement of the pre-programmed movement routine. In some aspects, the quantitative application characteristic is assessed for more than one movement of the pre-programmed movement routine.

In sensor in some aspects may be capable of measurement in three-dimensions, or optionally is capable of measuring force in compressions, tension, or combinations thereof, or is capable of measuring positive or negative torque about an axis in each of three dimensions.

The controller in some aspects is configured to direct the extender to move and apply the coating composition to the test bed according to the pre-programmed movement routine and based on information received from the sensor.

The system in some aspects may further includes a camera, with the analyzer configured to receive a photograph from the camera of the test bed, before, during, or following the pre-programmed movement routine, or a combination thereof; or a surface morphology evaluator. The quantitative application characteristic in some aspects may include break of the coating composition from the coating composition applicator, touch-up, or open-time.

The system in some aspects includes an output device to report data from the sensor or quantitative application characteristic to a user. In some aspects, the pre-programmed movement routine includes movements resulting in overlapping applications of coating composition.

In some aspects, the pre-programmed movement routine is based on force control, position control, or combinations thereof. In some aspects, the pre-programmed movement routine includes number of paths, number of strokes within a path.

In some aspects, the controller controls the extender according to a feedback loop. In some aspects, the pre-programmed movement routine is based on a linear velocity, linear acceleration, angular velocity or acceleration information of the coating composition applicator, or a combination thereof. In some aspects, the sensor is a torque-force sensor, or a positional sensor. In some aspects, the coating composition applicator is a brush, or a roller with a roller cover.

In some aspects, the rigid frame includes a steel beam, or comprises architectural structure. In some aspects, the coating composition is a paint, or a stain. In some aspects, the substrate or test bed incudes wood, drywall, paper, metal, aluminum, plastic, polyvinyl chloride (PVC), hard polymer, steel, paint test chart, sealed chart, unsealed chart, paint test card, brushout card, or a combination thereof.

Also disclosed is a method of formulating a coating composition comprising determining a quantitative application characteristic for a coating composition or applicator using the system of the present disclosure and adjusting one or more components of the coating composition or design attributes of the applicator using the quantitative application characteristic.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout, and in which:

FIG. 6 is an exemplar database of quantitative coating composition information that may be used to formulate amounts and types of components of ingredients, as well as processing parameters, of a coating composition or to design an applicator.

Figure 1:
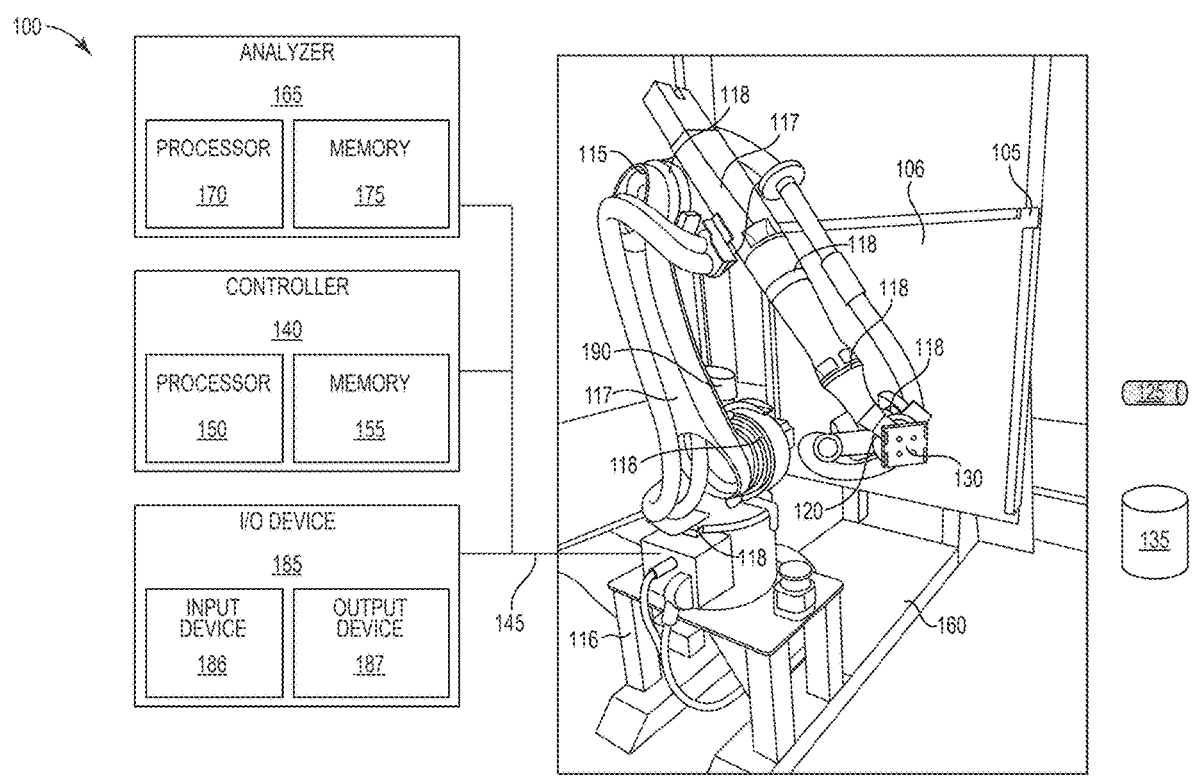
FIGS. 1-2 show a system for objectively quantifying properties of a coating composition or coating composition applicator in accordance with various disclosed aspects herein.

The invention may be embodied in several forms without departing from its spirit or essential characteristics. The scope of the invention is defined in the appended claims, rather than in the specific description preceding them. All embodiments that fall within the meaning and range of equivalency of the claims are therefore intended to be embraced by the claims.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures, including, but not limited to, a microcontroller containing both a processor and memory, programmable logic array (PLA), application specific integrated circuit (ASIC), or any type of device suitable for processing signals, performing general computing, and/or arithmetic functions. The processor can include various modules to execute various functions.

A "memory" as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can also include a disk. The memory can store an operating system that controls or allocates resources of a computing device. The memory can also store data for use by the processor.

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system and/or program that controls or allocates resources of a computing device.

As used herein, the terms "coupled" and "connection" encompass both direct and indirect contact. That is, an object that is coupled to another object may be in direct contact with the other object, or may be in indirect contact with the other object such that one or more intermediate objects are positioned between and in direct contact with the two objects.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical non-transitory signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments described herein include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

The embodiments also relates to an apparatus for performing the operations herein. This apparatus can be specially constructed for the purposes, e.g., a specific computer, or it can comprise a general-purpose computer selectively activated or reconfigured by a computer program stored in the computer. Such a computer program can be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, ASICs, or any type of media suitable for storing electronic instructions, and each electrically connected to a computer system bus. Furthermore, the computers referred to in the specification can include a single processor or can be architectures employing multiple processor designs for increased computing capability.

The algorithms and displays presented herein are not inherently related to any particular computer or other apparatus. Various general-purpose systems can also be used with programs in accordance with the teachings herein, or it may be convenient to construct more specialized apparatus to perform the method steps. The structure for a variety of these systems will appear from the description below. In addition, the embodiments are not described with reference to any particular programming language. It will be appreciated that a variety of programming languages can be used to implement the teachings of the embodiments as described herein, and any references below to specific languages are provided for disclosure of enablement and best mode of the embodiments.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

As was stated above, traditionally, application of a coating composition is performed by an individual who applies the coating composition by an applicator, such as a roller or brush. After application, the individual assesses one or more application characteristics, such as, but not limited to, hide, transfer, coverage, drag, and other aspects of the coating composition. Although some characteristics, like hide, drag or rolling resistance, spatter, and surface quality, may be subjectively graded on a 1 through 5 scale, others, like coverage, film thickness, and wet film volume applied may be quantitatively evaluated based on the area covered by a given volume of coating composition. These ratings may be used by the formulator to compare different coating compositions and applicators, such as, but not limited to, roller covers and brush formulations, which in turn helps to design new products with desired application-related properties. While the ratings are helpful, the results can vary based on the individual expert, consistency of the individual over time, composition of the various coatings, and, if many coatings are applied on a given day, fatigue of the individual may affect the ratings.

Figure 2:
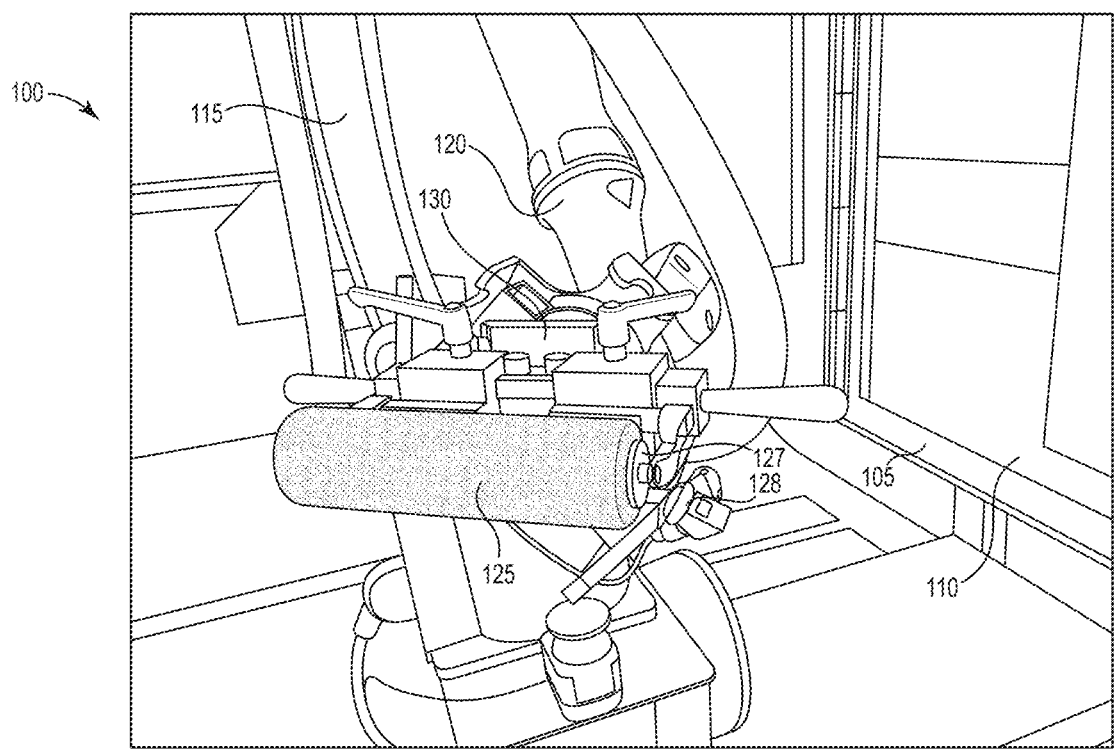

FIGS. 1 and 2 show a system 100 for objectively quantifying properties of a coating composition 135 or coating composition applicator 125, which achieves the goal of measuring application properties in an objective and repeatable manner, by having the ability to repetitively apply a coating composition in a consistent manner. The system 100 makes it possible to quantify application properties that were historically assessed subjectively and to obtain quantitative evaluations independent of human/user impact. In this way, the disclosed system allows an evaluation and comparison of coating compositions or applicators based on the inherent characteristics of the coating composition or applicator test subjects alone. The coating composition 135 may include, but is not limited to, a paint, a stain, or another coating composition. As used herein, a stain is a transparent or semi-transparent solution or suspension of coloring agents (such as, for example, dyes or pigments and the like) in a carrier, and is designed to color a surface without hiding it or leaving a continuous film. A paint is a coating composition including pigment (or dye) and polymeric binder in a carrier, which when applied to form a thin (e.g., 100 μm) wet thickness film on a freshly-sanded smooth wood surface, will when dried hide both the wood grain and its texture and will present a new surface with its own appearance. Although defined here with reference to application on wood, a paint can be applied to a wide variety of substrates, including architectural materials such as drywall, cementboard, Hardie board, and roofing materials, or metal, plastic, or other cementitious surfaces. Coating composition applicator 125 may be a brush, roller, sprayer, caulk gun, or drawdown bar, for example.

The system 100 has a test bed 105 to which a coating composition 135 is applied. The coating composition 135 may be directly applied to the test bed 105 or to a substrate 110 mounted on the test bed 105. The substrate 110 can be mounted to the test bed 105 using vacuum, clip, or clamp, to prevent the substrate 110 from moving on the test bed 105 while the coating composition applicator 125 is pressing on and translating across the test bed 105 to apply the coating composition 135 to the substrate 110 and/or test bed 105.

The test bed 105 can be oriented vertically, horizontally, or in any orientation. Further, the substrate 110 can be mounted vertically, horizontally, or in any direction. Orientating the test bed in a desired position allows for simulation of application in a desired real-world environment, such as a ceiling, wall, or floor. The test bed 105 can be any solid object providing structural support for substrate 110, such as, but not limited to, a stiff metal panel, wood panel, drywall, a stiff cardboard card, steel, or aluminum. Substrate 110 can include wood, drywall, paper, metal, aluminum, steel, plastic, polyvinyl chloride (PVC), hard polymer, paint test chart, sealed chart, unsealed chart, paint test card, brushout card, or a combination thereof. Test bed 105 and substrate 110 may also collectively be a pre-existing architectural feature such as a wall, door, or trim such that the substrate to which the coating composition is applied is the architectural feature and the architectural feature also provides structural support as a test bed.

The system 100 also has a controlled sensing arm 115. During operation, the controlled sensing arm 115 moves according to one or more pre-programmed movement routines to apply the coating composition to substrate 110 mounted on test bed 105 while torque-force sensor collects real-time data. The controlled sensing arm extends from base 116 to an extender 120. In an exemplary embodiment, the robotic controlled sensing arm 115 may have movement on any multiplicity of axes, 3, 4, 5, 6 . . . etc. and in an exemplary embodiment is a 6-axis robot. The extender 120 may be coupled to the handle of a coating composition applicator 125. The controlled sensing arm 115 can include one or more segments 117 between the base 116 and the extender 120, with a motor 118 located at each joint formed between segments 117 and the joint between base 116 and adjacent segment 117, as well as between the extender 120 and the last of segments 117. Each segment 117 optionally may include a linear actuator. Each motor 118 can also include an encoder that outputs position information for the segment(s) 117, extender 120, base 116, or a combination thereof. Each joint between segments 117 provides movement in one or more translational or rotational axes, thereby allowing the controlled sensing arm a wide range of possible movements.

The extender 120 also includes a sensor behind mounting block 130 that is capable of measuring force, torque, or combinations thereof. In an exemplary embodiment, the sensor is coupled to and located between the extender 120 and the mounting block 130. In an exemplary embodiment, the sensor may be a 6-axis force torque sensor that can measure force and torque in each of the three-dimensions (e.g., X, Y, and Z dimensions). Force can be compression, tension, or a combination thereof. Torque can be positive or negative torque about an axis in each of the three-dimensions. In some exemplary embodiments, the sensor can be a torque-force sensor. In other exemplary embodiments, the sensor can be a positional sensor. The sensor provides periodic data to analyzer 165 and controller 140. The sensor may provide data, for example, ten times each second, twelve times each second, 15 times each second, 25 times each second, or more. In this way, information from sensor supports real-time data collection and feedback control of extender 120.

Through analysis of data from the sensor, the system can be used to measure such things as, but not limited to, the weight of the coating composition 135 on the coating composition applicator 125 at any particular time during measurement, weight of the coating composition 135 applied per area of test bed 105 by the coating composition applicator 125, rolling resistance of the coating composition applicator 125, brush drag resistance of the coating composition applicator 125, or a combination thereof.

The extender 120 is configured to apply, using the coating composition applicator 125, a coating composition 135 to the test bed 105 according to one or more pre-programmed movement routines 300 for the controlled sensing arm 115. As described further herein, directions for the pre-programmed movement routine is provided by controller 140 according to memory 155 provided therein.

The controlled sensing arm 115 can further include a tachometer coupled to the coating composition applicator 125. In an exemplary embodiment, the tachometer can include a black and white rotator 127 on an end cap of the coating composition applicator 125 with a remote detector 128 coupled to the coating composition applicator 125. The remote detector 128 may be any detector that is capable of detecting the transition from black to white of the rotator 127, such as, but is not limited to, an optical detector or a laser detector. Remote detector 128 may also be a camera. The camera may be, but is not limited to, a video, still, high speed camera, or a combination thereof. This rotator 127 and remote detector 128 form the tachometer that permits the detection of slippage of the coating composition applicator 125 implemented as a paint roller.

Further, a controller 140 is coupled to the extender 120 by a wireless or wired communication link 145, the controller 140 having one or more processors 150 configured to direct the extender 120 to move and apply the coating composition 135 to the test bed 105 according to the pre-programmed movement routine stored in and retrieved from memory 155, and optionally, based on information received from the sensor.

A rigid frame 160 connects the test bed 105 and the base 116 of the controlled sensing arm 115, and limits movement between the test bed 105 and a base 116 of the controlled sensing arm 115. The rigid frame 160 can be a rigid connection, such as, a steel beam, an architectural structure, or a combination thereof. As the sensor measures torque and force during coating composition application to test bed 105, the rigid frame 160 ensures accuracy of the torque and force measurements. Moreover, presence of a rigid frame allows the normal force of the applicator relative to substrate 106 to be controlled and thereby permit quantitative control of the application force of the applicator against substrate, independent variance from human application or forces. An architectural structure, may include, but is not limited to, a wall, floor, wood, metal, steel beam, architectural materials, or a combination thereof.

In some embodiments, the system 100 may also include a surface morphology evaluator. The surface morphology evaluator may be any device suitable for evaluating topography of the cured coating composition 135 on the test bed 105. The surface morphology evaluator may be, but is not limited to, a camera or a non-contact profilometer. The a non-contact profilometer may be a laser or contract profilometer, such as, but not limited to, a stylus, or a combination thereof. The surface morphology evaluator may be mounted to a location on the system 100 suitable for evaluating topography of the cured coating composition 135 on the test bed 105, such as, but not limited to, on the rigid frame 160, extender 120, controlled sensing arm 115, test bed 105, substrate 110, mounting block 130, applicator 125, or a combination thereof.

The system 100 further includes an analyzer 165 configured for wireless or wired communication with the sensor and the controller 140, such as through the communication link 145. The analyzer 165 records the position of the applicator 125 and any position corrections applied by the controller 140. The analyzer 165 has at least a processor 170 and memory 175, and is configured to record in memory 175 data from the sensor and data from the controller 140, and optionally, user-inputted data, coating composition 135 data, applicator 125 data, data from the encoder of motors 118, data from the remote detector 128, data from the surface morphology evaluator, data from the camera 190, and combinations thereof. The analyzer 165 then derives, using calculations performed by the processor 170 and the information stored in memory 175, quantitative application characteristics of the coating composition 135, the applicator 125, or both. The coating composition data may include, but is not limited to, pigment volume concentration, density, non-volatile matter by volume (NVV), contrast ratio, hiding due to scattering (s/mil), and hiding due to absorption (k/mil), or the presence of components and concentrations.

The system of the present disclosure allows for quantitative application characteristics measured independent of human application variation. Therefore, the quantitative application characteristics are suitable for objective comparison of coating compositions 135, applicators 125, or both.

The quantitative application characteristics may include, but are not limited to, force during application, such as force applied by the applicator 125 to the test bed 105, such as, but not limited to, the force normal to the face 106 of test bed 105 to which the coating composition 135 is being applied and the force in the same plane as the face 106 of the test bed. In some embodiments, the force normal to the face 106 of test bed 105 may be controlled and the force in each axis of the plane of the face 106 of the test bed 105 may be measured.

The quantitative application characteristics may also include, but are not limited to, the drag of the applicator 125, such as when the applicator 125 is a brush; rolling resistance of the applicator 125, such as for a roller cover, when the applicator 125 is a roller; and change in weight of the coating composition 135 present on the applicator. Change in weight of the coating composition 135 at the beginning and end of the preprogrammed routine may provide a measure of the overall weight applied to the test bed (less dripping and spattering loss), during the full pre-programmed routine or a particular portion of the movement routine, such as, but not limited to, during a particular stroke or series of strokes.

The quantitative application characteristics may also include, but are not limited to, the amount, such as, but not limited to, the volume, weight, weight solids of coating composition 135 applied to the substrate 110 or test bed 105, or combinations thereof; the unit area of the substrate 110 or test bed 105 to which the coating composition 135 is applied per amount of coating composition 135 applied, such as, but not limited to, square feet per gallon of coating composition 135 applied to the test bed 105 or substrate 110; wet film thickness of the coating composition 135; dry film thickness of the coating composition 135; dry volume of the coating composition 135; wet volume of the coating composition 135; unloading efficiency of the coating composition 135, applicator 125, or combinations thereof, such as the volume of coating composition 135 applied to the substrate 105 or test bed 110/volume of coating composition 135 loaded on applicator 125 prior to the application of the coating composition 135 to the substrate 105 or test bed 110; dry hide of the coating composition 135; wet hide of the coating composition; touch-up of the coating composition 135; or combinations thereof. The quantitative application characteristics may also include, but are not limited to, a break of the coating composition 135 from the applicator 125, such as, but not limited to, the observation of the transfer of the coating composition 135 from the applicator 125 to the substrate 105 or test bed 110. The quantitative application characteristics may also include, but are not limited to, an open time of the coating composition 135. The open time may be the elapsed time the after application of the coating composition 135 to the substrate 105 or test bed 110 by the applicator 125, until the coating composition 135 is no longer sufficiently wet to be spread on the substrate 105 or test bed 110 by the applicator 125.

The quantitative application characteristics may further include, but are not limited to, quantification of spatter, which is small droplets of coating composition 135 projected off the coating composition applicator 125 while applying the coating composition 135 onto the substrate 110. In an exemplary embodiment, this can be small droplets of coating composition 135 projected off a paint roller cover while rolling paint onto the test bed 105 or substrate 110.

The quantitative application characteristics may further include, but are not limited to, revolutions of the coating composition applicator 125 per length of a movement of the pre-programmed movement routine, such as when the coating composition applicator 125 is a roller.

In an exemplary embodiment of the system 100, one or more quantitative application characteristics may be assessed by the analyzer 165 for more than one movement of the pre-programmed movement routine. Further, in an exemplary embodiment of the system 100, one or more quantitative application characteristics may be assessed by the analyzer 165 following more than one movement of the pre-programmed movement routine, such as, but not limited to, more than one pass of the coating composition applicator 125 over the test bed 105 while applying coating composition 135.

The dry hide may be derived by applying coating composition 135 to substrate 110 having black and white colored substrate portions. In some preferred embodiments, substrate 110 used to evaluate dry hide has a black and white checkerboard pattern, but the black and white portions may be arranged in any configuration, such as stripes, zig-zag, or waves. Once the coating composition 135 is dry, the reflectance of the coating composition 135 over the white and black squares is measured, such as through the use of a color eye. The dry hide (contrast ratio) can be calculating by dividing the average reflectance over black by the average reflectance over while and multiplying by 100%. Use of black and white colored substrate portions to evaluate hide allows determination of hiding due to scattering (s/mil), and hiding due to absorption (k/mil).

Rolling resistance of the roller cover may be derived by rolling the applicator 125 implemented as a roller and using the sensor to measure the force required to roll the applicator 125 in the direction of the roller's intended movement, parallel to the plane of the test bed 105. Brush drag, the resistance to the sliding of the applicator 125 implemented as a brush across the test bed 105 as the force measured by the sensor required to move the applicator 125 in the direction of its intended movement across the test bed 105, parallel to the plane of the test bed 105.

The weight of the coating composition 135 applied to the test bed 105 may be derived after each path 501, after each stroke, or a combination thereof, by moving the applicator 125 away from the test bed 105 before a first stroke and after each stroke, and measuring the downward force on the applicator 125 using the sensor and converting the downward force to weight loss during the stroke. The weight of the coating composition 135 applied to the test bed 105 can also be used to derive the volume of coating composition 135 applied to the test bed 105 by using the density of the coating composition 135 and the formula, volume=weight/density. Further, the square feet per gallon of coverage of the coating composition 135 can be derived using the volume applied and the surface area of test bed 105 covered by the coating composition 135. Additionally, the wet film thickness of the coating composition 135 can be derived using the volume of coating composition 135 applied divided by the surface area to which the coating composition 135 is applied. Further, the dry film thickness of the coating composition 135 can be derived by multiplying the wet firm thickness by the non-volatile volume (NVV) of the coating composition 135. Additionally, the slippage of applicator 125 when implemented as a roller can be derived by dividing the sum of the circumferential revolutions generated while rolling as measured using the tachometer 126 divided by the total distance translated by the applicator 102 across the test bed 105 and the resulting value multiplied by 100%. Further, the unload efficiency of the applicator 125 when implemented as a roller can be derived by dividing the volume of coating composition 135 on the test bed 105 by the volume of coating composition 135 in the roller cover prior to the start of the application of the coating composition 135 to the test bed 105. The resulting value is then multiplied by 100%.

The analyzer 165 may also derive and record subjective quality criteria, which are criteria that capture variations in the application of the coating composition by a human, such as variations from stroke to stroke or from one coating composition 135 to another. Subjective criteria can include, but are not limited to, foam, stipple, flow, leveling, or combinations thereof of the coating composition 135. The analyzer 165 may also derive and record dry hide, wet hide, the effect of multiple coats, sheen after drying, or combinations thereof.

The system 100 may also include an input/output (I/O) device 185 to receive user-input data, report data from the sensor to a user, report quantitative applications characteristics to a user, or combinations thereof. The I/O device 185 may include an input device 186, an output device 187, or a combination thereof. The I/O device 185 may be, but it not limited to, one or more of a screen, printer, storage device, USB memory card, hard drive, flash memory, human-machine interface, and/or keyboard.

The system 100 may also include a camera 190 configured to capture an image of the test bed 105 before, during, or following the pre-programmed movement routine, or a combination thereof, and provide the captured images to the analyzer 165. The analyzer 165 receives the captured images from the camera 190 using communication link 145, stores the images in memory 175, and analyzes the images using processor 170. The camera 190 may be, but is not limited to, a video, still, high speed camera, or a combination thereof.

The system 100 may also include a laboratory scale to help ensure the coating composition 135 is consistently loaded onto the coating composition applicator 125 before applying the coating composition 135 onto the test bed 105.

Figure 3:
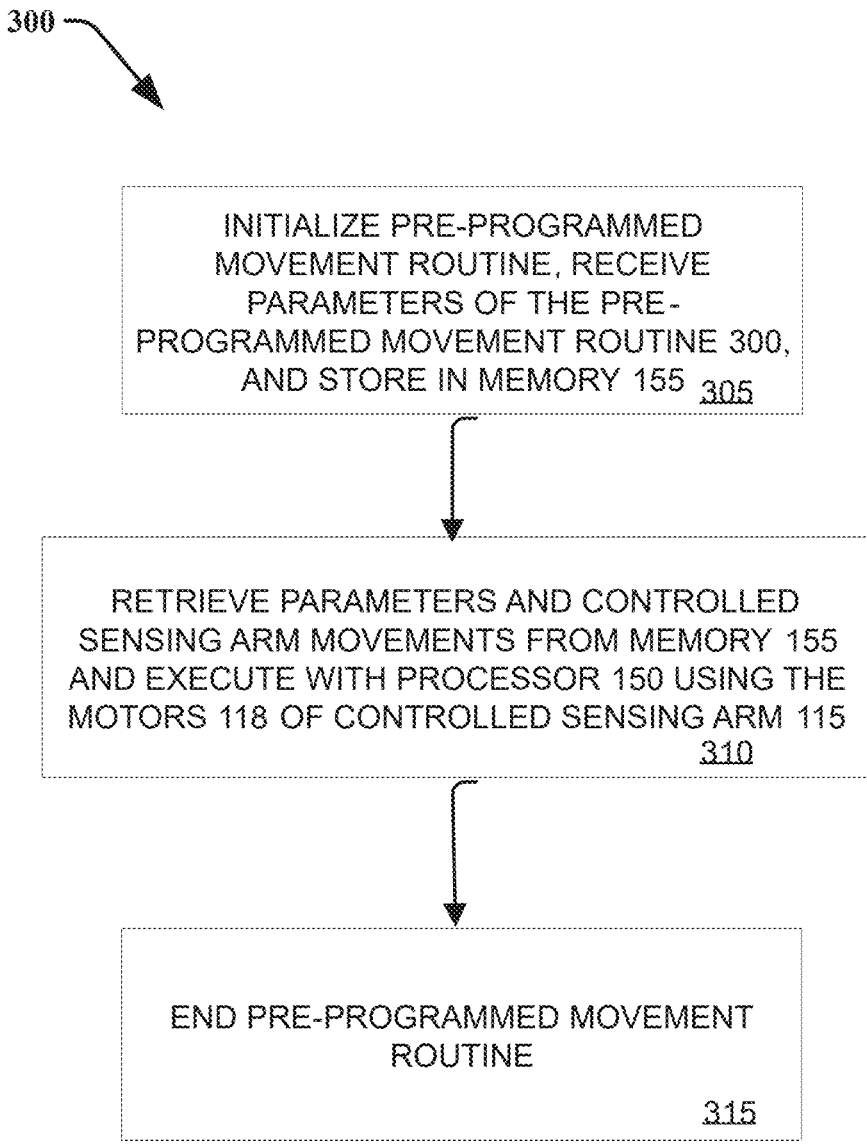
FIG. 3 is a flow diagram of a pre-programmed movement routine in accordance with various disclosed aspects herein.

FIG. 3 is a flowchart of a pre-programmed movement routine 300 stored in memory 155 and executed by processor 150 of controller 140 using controlled sensing arm 115. The pre-programmed movement routine 300 may include instructions for movement, acceleration, and time for any one of the motors 118 in the controlled sensing arm 115. The controlled sensing arm 115 may be a multi-axis controlled sensing arm 115 which includes more than one axis of movement, with one or more motors 118 powering movement in a rotational, lateral, or vertical movement, or combinations thereof. Thus, the pre-programmed movement routine 300 may include instructions on the movement, position, velocity, acceleration, torque, or rotational speed of one or more of axis of the controlled sensing arm 115. The pre-programmed movement routine 300 thus defines a movement of the controlled sensing arm 115, extender 120, and the applicator 125 attached thereto, when the pre-programmed movement routine 300 is executed.

In block 305, the routine 300 is initialized and parameters of the pre-programmed movement routine 300 are received from the I/O device 185, such as via the input device 186 and stored in memory 155. In block 310, the controlled sensing arm movements dictated by the pre-programmed movement routine 300 are retrieved from memory 155 and executed by processor 150 using motors 118 of controlled sensing arm 115, while recording data related to the pre-programmed movement routine 300 is recorded in memory 175 of analyzer 165 by processor 170 of analyzer 165. The controller 140 controls the movements of extender 120 during the execution of the pre-programmed movement routine 300. In an exemplary embodiment of the system 100, the controller 140 directs the extender 120 to move and apply the coating composition 135 to the test bed 105 according to the pre-programmed movement routine 300 and based on information received from the sensor.

In an exemplary embodiment of the system 100, the controller 140 controls the movements of extender 120 using a feedback loop during the execution of the pre-programmed movement routine 300. Stated alternatively, the pre-programmed movement routine 300 can have a feedback loop for controlling the movements of extender 120. The force normal to the test bed 105 can be measured by the sensor and used by the force feedback loop implemented as a PID controller loop. The pre-programmed movement routine 300 can be defined by position, speed, acceleration, or force information of the extender 120, or combinations thereof. The pre-programmed movement routine 300 can also be defined by the angular velocity or acceleration information of the roller cover, or a combination thereof, when the applicator 125 is a roller. The pre-programmed movement routine 300 can also be defined by the linear velocity or acceleration information of the brush, or a combination thereof, when the applicator 125 is a brush. The force of the applicator 125 against the test bed 105, velocity of the applicator 125 across the test bed 105, and acceleration of the applicator 125 with respect to the test bed 105 are each adjustable in the pre-programmed movement routine 300.

In some exemplary embodiments, the coating composition applicator 125 can be a brush. In other exemplary embodiments, the coating composition applicator 125 can be a roller with a roller cover. The roller cover can be a standard 9-inch roller cover, which permits for the testing of the performance of various fibers, nap thicknesses, woven patterns, or a combination thereof of the roller cover. In other exemplary embodiments, the coating composition applicator 125 can be a brush. In an embodiment, the brush can be up to about 4 inches wide. Brushes having various bristle lengths, widths, as well as different bristle chemistries can be evaluated using the sensor. This information provided by the sensor regarding the brushes and roller covers provide information regarding the performance of the coating composition 135, as well as the performance of the roller, brush, or both.

The pre-programmed movement routine 300 can also be defined by force control, position control, or combinations thereof. The force control can be based on the output of the sensor. The position control can be based on the output of remote detector 128, the output of encoders of motors 118, and input to motors 118, or combinations thereof. The input to motors 118 may include the pre-programmed movement routine 300 instructing one or more motors 118 to travel to a specific position or to move base 116, segments 117, extender 120, or a combination thereof to a specific position.

Figure 5:
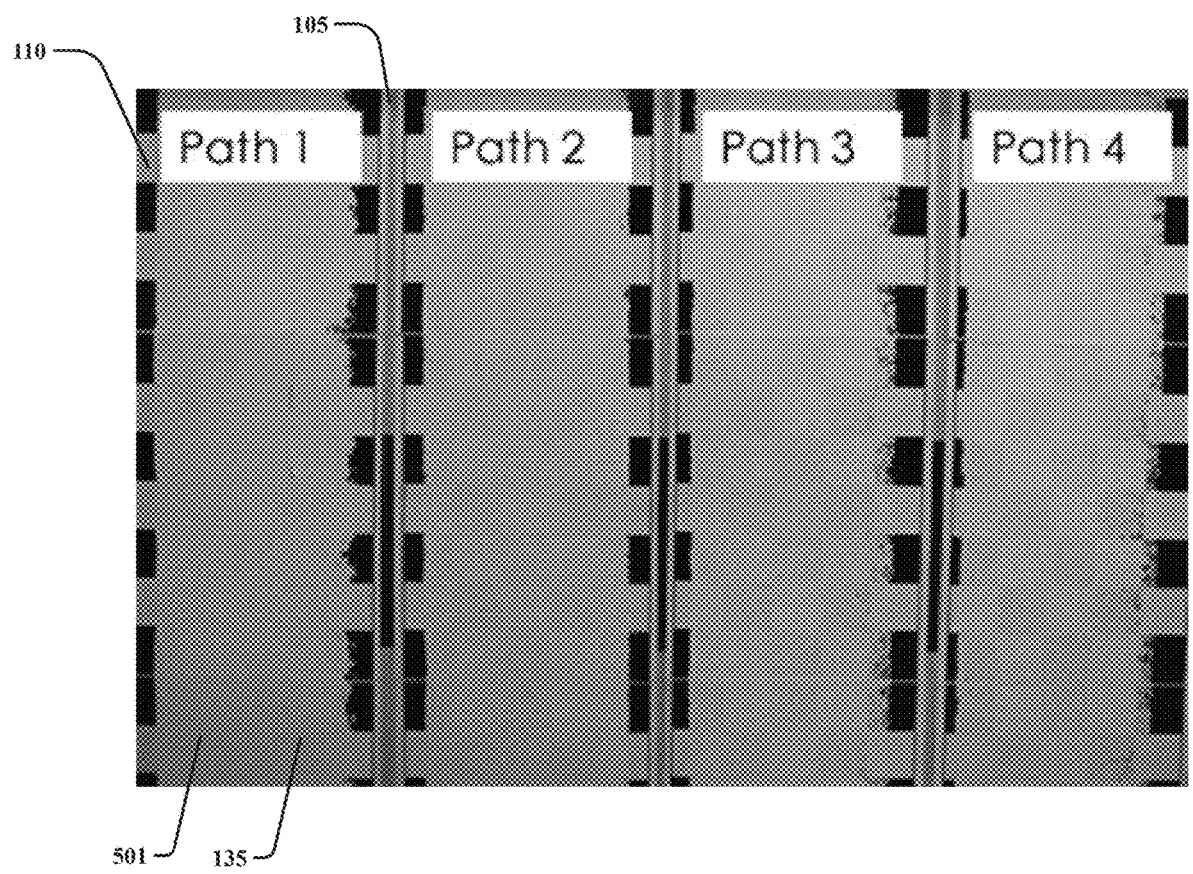
FIG. 5 depicts paths of coating composition made by the system in accordance with various disclosed aspects herein.

The pre-programmed movement routine 300 can also include movements of the extender 120 resulting in overlapping applications of the coating composition 135 on the test bed 105 using the applicator 125. The pre-programmed movement routine 300 can also include the number of paths made by the applicator 125 and number of strokes of the applicator 125 within a path on the test bed 105. FIG. 5 shows four paths 501 on substrate 110 on test bed 105. A path 501 can include verticals, diagonals, horizontals, overlapping portions, non-overlapping portions, or combinations thereof, of coating composition 135 applied to substrate 110 by applicator 125. A path 501 can be comprised of a single stroke or multiple strokes. A single stroke can be a single up or down of the applicator 125, while multiple strokes would be multiple ups and/or downs of the applicator 125.

Following block 310, the pre-programmed movement routine 300 ends in block 315. In some exemplary embodiments of block 315, the extender 120 returns to a home position.

The data related to the pre-programmed movement routine 300 that is recorded during the pre-programmed movement routine 300 and stored in memory 175 of analyzer 165 includes, but is not limited to, data from the encoders of motors 118, sensor, remote detector 128, surface morphology evaluator, camera 190, or combinations thereof.

Figure 4:
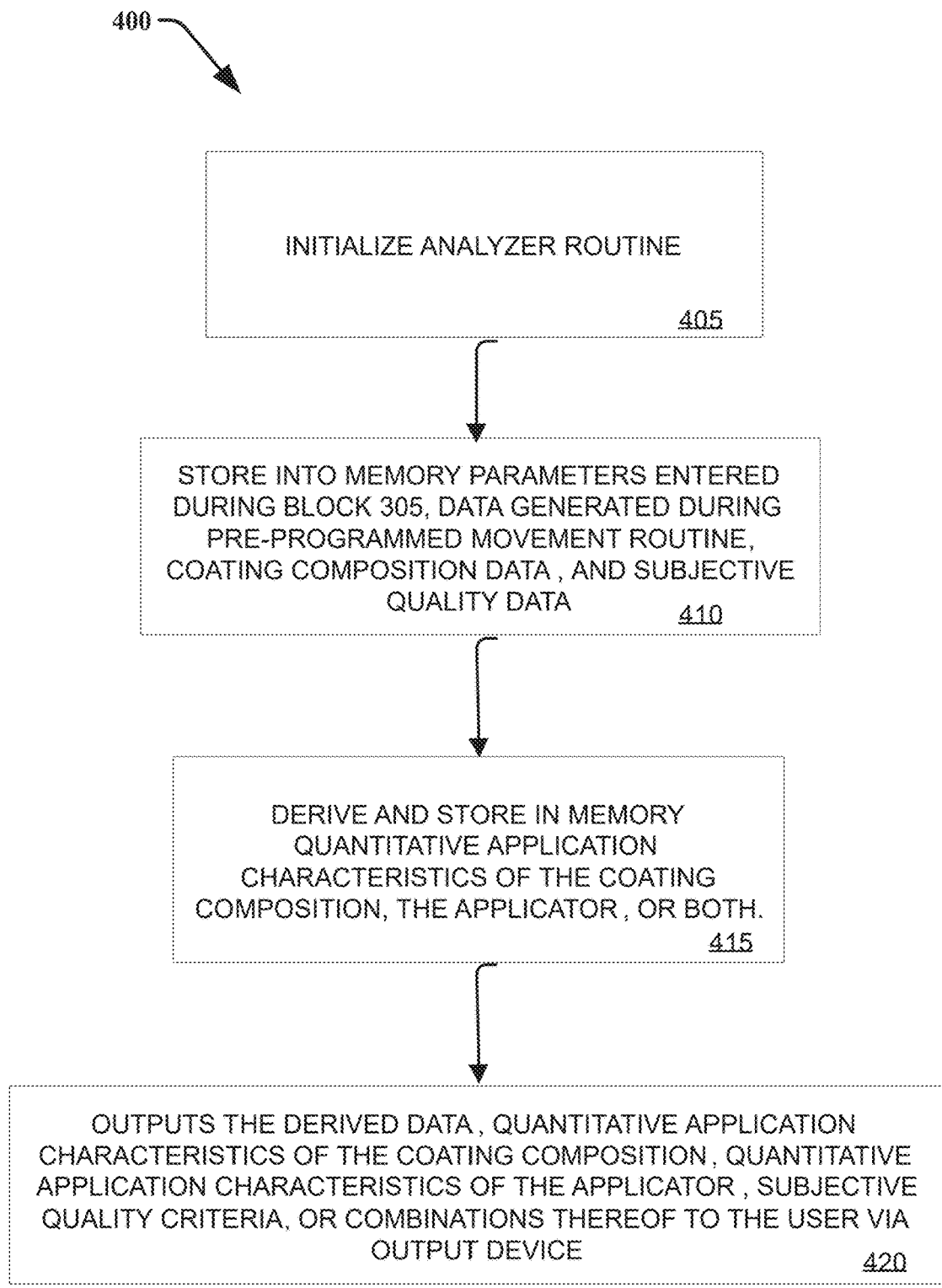
FIG. 4 is a flow diagram of an analyzer routine in accordance with various disclosed aspects herein.

FIG. 4 is a flowchart of the analyzer routine 400 stored in memory 175 and executed by processor 170 of analyzer 165. In block 405, the routine 400 is initialized and retrieved from memory 175. In block 410, parameters of the pre-programmed movement routine 300 entered by the user through I/O device 185 during block 305 are stored in memory 175. Further, data that is generated during the pre-programmed movement routine 300 and stored in memory 175 of analyzer 165, which includes, but is not limited to, data from the encoders of motors 118, sensor, remote detector 128, surface morphology evaluator, camera 190, or combinations thereof. Further, coating composition 135 and subjective quality data may also be stored in memory 175. The analyzer routine 400 enters block 410 when the pre-programmed movement routine 300 enters block 305 and remains in block 410 until the pre-programmed movement routine progresses to block 315. Once the pre-programmed movement routine progresses to block 315, the analyzer routine progresses to block 415.

In block 415, the analyzer 165 then derives, using calculations performed by the processor 170 and the information stored in memory 175, quantitative application characteristics of the coating composition 135, the applicator 125, or both. The analyzer 165 may also derive subjective quality criteria. The derivations are then stored in memory 175.

In block 420, the analyzer 165 outputs the derived data, quantitative application characteristics of the coating composition 135, quantitative application characteristics of the applicator 125, subjective quality criteria, or combinations thereof to the user via output device 187. The output device 187 may also output to the user any other information stored in memory 175, including, but not limited to, data from the encoders of motors 118, sensor, remote detector 128, surface morphology evaluator, camera 190, or combinations thereof.

In another aspect, the system 100 for objectively quantifying properties of a coating composition 135 or coating composition applicator 125 can be used to formulate amounts and types of components of ingredients, as well as processing parameters, of coating composition 135 or for design of applicator 125. Evaluations of quantitative application characteristics derived in Step 410 may be associated with varied components of coating composition 135 or applicator 125 as separate database entries for storing such information. FIG. 6 provides an exemplar database. The database may, for instance, include information regarding a test identifier (Test ID), the base coating composition formula for coating composition 135, an identifier for coating applicator 125 used in the test, as well as one or more variables and quantitative application characteristics associated tests using one or more preprogrammed movement routines of system 100. Data from the database may be used to derive relationships between variance in coating composition 135 or applicator 125 and quantitative coating characteristics using different components of coating composition 135, different coating applicators 125, different substrates 110, or application conditions. Reformulation of coating composition 135 or changes in design attributes of applicator 125 using interpolation, least squares, predictive analytics, artificial intelligence, or any other suitable means of data generated by system 100 and quantitative coating characteristics produced therefrom can thus be undertaken. Applicator design attributes may include, for instance, roller length, roller cover nap size (or thickness), type of nap material(s) such as fiber type and fiber blends, denier, density of nap, nap forming method (woven, non-woven, knitted) and combinations thereof, also brush bristle filament type and filament blends, filament profile, length, stiffness, cut pattern, denier, and combinations thereof.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the systems, components, and/or methodologies described above may be combined or added together in any permutation. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

List of Exemplary Embodiments

Embodiment 1: A system for objectively quantifying coating composition or coating applicator properties comprising: a test bed to which a coating composition is applied; a controlled sensing arm including an extender coupled to a coating composition applicator, and a sensor capable of measuring force, torque, or combinations thereof, the sensor coupled to the extender and the coating composition applicator, wherein the extender is configured to apply, using the coating composition applicator, a coating composition to the test bed according to one or more pre-programmed movement routines for the controlled sensing arm; a controller coupled to the extender by a wireless or wired communication link, the controller having one or more processors and memory configured to direct the extender to move and apply the coating composition to the test bed according to the pre-programmed movement routine, and optionally, based on information received from the sensor; a rigid frame connecting the test bed and the controlled sensing arm; and an analyzer coupled to the sensor and the controller by wireless or wired communication link, the analyzer including at least a processor and memory and configured to record data from the sensor and data from the controller, and optionally, user-inputted data, coating composition data, or combinations thereof, and derive quantitative application characteristics of the coating composition, the coating composition applicator, or both, and subjective quality criteria, wherein the quantitative application characteristics are independent of human application variation and subjective quality criteria; and wherein the quantitative application characteristics are suitable for objective comparison of coating compositions, coating composition applicators, or both.

Embodiment 2: The system of any preceding Embodiment, wherein the extender includes one or more segments.

Embodiment 3: The system of any preceding Embodiment, wherein the extender includes one or more motors.

Embodiment 4: The system of any preceding Embodiment, wherein at least one segment includes a linear actuator.

Embodiment 5: The system of any preceding Embodiment, wherein the quantitative application characteristic includes force during application.

Embodiment 6: The system of any preceding Embodiment, wherein the quantitative application characteristic includes drag of the coating composition applicator.

Embodiment 7: The system of any preceding Embodiment, wherein the quantitative application characteristic includes rolling resistance of the coating composition applicator.

Embodiment 8: The system of any preceding Embodiment, wherein the quantitative application characteristic includes weight per area of the coating composition applied to the substrate or test bed.

Embodiment 9: The system of any preceding Embodiment, wherein the quantitative application characteristic includes amount of coating composition applied to the substrate or test bed.

Embodiment 10: The system of any preceding Embodiment, wherein the quantitative application characteristic includes square feet per gallon of coating composition applied.

Embodiment 11: The system of any preceding Embodiment, wherein the quantitative application characteristic includes wet film thickness.

Embodiment 12: The system of any preceding Embodiment, wherein the quantitative application characteristic includes dry film thickness.

Embodiment 13: The system of any preceding Embodiment, wherein the quantitative application characteristic includes unloading efficiency.

Embodiment 14: The system of any preceding Embodiment, wherein the quantitative application characteristic includes spatter.

Embodiment 15: The system of any preceding Embodiment, wherein the quantitative application characteristic includes dry volume.

Embodiment 16: The system of any preceding Embodiment, wherein the quantitative application characteristic includes wet volume.

Embodiment 17: The system of any preceding Embodiment, wherein the controlled sensing arm further incudes a tachometer coupled to the coating composition applicator.

Embodiment 18: The system of any preceding Embodiment, wherein the quantitative application characteristic includes revolutions of the coating composition applicator per length of a movement of the pre-programmed movement routine.

Embodiment 19: The system of any preceding Embodiment, wherein the quantitative application characteristic is assessed for more than one movement of the pre-programmed movement routine.

Embodiment 20: The system of any preceding Embodiment, wherein the quantitative application characteristic is assessed following more than one movement of the pre-programmed movement routine.

Embodiment 21: The system of any preceding Embodiment, wherein the sensor is capable of measurement in three-dimensions.

Embodiment 22: The system of any preceding Embodiment, wherein the sensor is capable of measuring force in compression, tension, or a combination thereof.

Embodiment 23: The system of any preceding Embodiment, wherein the sensor is capable of measuring positive or negative torque about an axis in each of three dimensions.

Embodiment 24: The system of any preceding Embodiment, wherein the controller is configured to direct the extender to move and apply the coating composition to the test bed according to the pre-programmed movement routine and based on information received from the sensor.

Embodiment 25: The system of any preceding Embodiment, wherein the system further includes a camera and the analyzer is configured to receive a photograph from the camera of the test bed, before, during, or following the pre-programmed movement routine, or a combination thereof.

Embodiment 26: The system of Embodiment 25, wherein the quantitative application characteristic includes dry hide.

Embodiment 27: The system of any of Embodiments 25 or 26, wherein the quantitative application characteristic includes wet hide.

Embodiment 28: The system of any of Embodiments 25 to 27, wherein the quantitative application characteristic includes break of the coating composition from the coating composition applicator.

Embodiment 29: The system of any of Embodiments 25 to 28, wherein the quantitative application characteristic includes touch-up.

Embodiment 30: The system of any preceding Embodiment, wherein the system further includes a surface morphology evaluator.

Embodiment 31: The system of any preceding Embodiment, wherein the quantitative application characteristic includes open time.

Embodiment 32: The system of any preceding Embodiment, wherein the system further includes an output device to report data from the sensor or a quantitative application characteristic to a user.

Embodiment 33: The system of any preceding Embodiment, wherein the pre-programmed movement routine is defined by extender position, speed, acceleration, or force information, or combinations thereof.

Embodiment 34: The system of any preceding Embodiment, wherein the pre-programmed movement routine includes movements resulting in overlapping applications of coating composition.

Embodiment 35: The system of any preceding Embodiment, wherein the pre-programmed movement routine is based on force control, position control, or combinations thereof.

Embodiment 36: The system of any preceding Embodiment, wherein the pre-programmed movement routine includes number of paths, number of strokes within a path.

Embodiment 37: The system of any preceding Embodiment, wherein the controller controls the extender according to a feedback loop.

Embodiment 38: The system of any preceding Embodiment, wherein the pre-programmed movement routine is based on a linear velocity, linear acceleration, angular velocity or acceleration information of the coating composition applicator, or a combination thereof.

Embodiment 39: The system of any preceding Embodiment, wherein the sensor is a torque-force sensor.

Embodiment 40: The system of any preceding Embodiment, wherein the sensor is a positional sensor.

Embodiment 41: The system of any preceding Embodiment, wherein the coating composition applicator is a brush.

Embodiment 42: The system of any preceding Embodiment, wherein the coating composition applicator includes a roller with a roller cover.

Embodiment 43: The system of any preceding Embodiment, wherein the rigid frame includes a steel beam to prevent movement between the test bed and a base of the controlled sensing arm.

Embodiment 44: The system of any preceding Embodiment, wherein the rigid frame comprises an architectural structure.

Embodiment 45: The system of any preceding Embodiment, wherein the coating composition is a paint.

Embodiment 46: The system of any preceding Embodiment, wherein the coating composition is a stain.

Embodiment 47: The system of any preceding Embodiment, wherein the substrate or test bed incudes wood, drywall, paper, metal, aluminum, plastic, polyvinyl chloride (PVC), hard polymer, steel, paint test chart, sealed chart, unsealed chart, paint test card, brushout card, or a combination thereof.

Embodiment 48: A method for formulating a coating composition comprising: determining a quantitative application characteristic for a coating composition or applicator using the system of any preceding claim; and adjusting one or more components present in the coating composition or one or more design attributes of the applicator using the quantitative application characteristic.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the systems, components, and/or methodologies described above may be combined or added together in any permutation. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for objectively quantifying at least one of coating composition and coating composition applicator properties comprising:
   a test bed to which a coating composition is applied;
   a controlled sensing arm including an extender coupled to a coating composition applicator, and a sensor capable of measuring force, torque, or combinations thereof, the sensor coupled to the extender and the coating composition applicator, wherein the extender is configured to apply, using the coating composition applicator, a coating composition to the test bed according to one or more pre-programmed movement routines for the controlled sensing arm;
   a controller coupled to the extender by a wireless or wired communication link, the controller having one or more processors and memory configured to direct the extender to move and apply the coating composition to the test bed according to the one or more pre-programmed movement routines;
   a rigid frame connecting the test bed and the controlled sensing arm; and
   an analyzer coupled to the sensor and the controller by wireless or wired communication link, the analyzer including at least a processor and memory and configured to record data from the sensor and data from the controller;
   the analyzer further configured to derive a quantitative application characteristic of the coating composition the coating composition applicator, or both;
   wherein the system further includes an output device to report data from the sensor or the quantitative application characteristic to a user;
   wherein the quantitative application characteristic is independent of human application variation and subjective quality criteria; and
   wherein the quantitative application characteristic is suitable for objective comparison of the coating composition, the coating composition applicator, or both.

2. The system of claim 1, wherein the extender includes one or more segments.

3. The system of any claim 2, wherein the extender includes one or more motors.

4. The system of any claim 2, where at least one segment includes a linear actuator.

5. The system of claim 1, wherein the quantitative application characteristic includes force during application.

6. The system of claim 1, wherein the quantitative application characteristic includes drag or rolling resistance of the coating composition applicator.

7. The system of claim 1, wherein the quantitative application characteristic includes weight per area or amount of the coating composition applied to the substrate or test bed.

8. The system of claim 1, wherein the quantitative application characteristic includes square feet per gallon of coating composition applied.

9. The system of claim 1, wherein the quantitative application characteristic includes wet film thickness or dry film thickness.

10. The system of claim 1, wherein the quantitative application characteristic includes unloading efficiency.

11. The system of claim 1, wherein the quantitative application characteristic includes spatter.

12. The system of claim 1, wherein the quantitative application characteristic includes dry volume or wet volume of applied coating composition.

13. The system of claim 1, wherein the controlled sensing arm further incudes a tachometer coupled to the coating composition applicator.

14. The system of claim 13, wherein the quantitative application characteristic includes revolutions of the coating composition applicator per length of a movement of the pre-programmed movement routine.

15. The system of claim 1, wherein the quantitative application characteristic is assessed for more than one movement, or following more than one movement, of the pre-programmed movement routine.

16. The system of claim 1, wherein the sensor is capable of measurement in three-dimensions.

17. The system of claim 1, wherein the sensor is capable of measuring force in compression, tension, or a combination thereof.

18. The system of claim 1, wherein the sensor is a torque-force sensor or a positional sensor.

19. The system of claim 1, wherein the sensor is capable of measuring positive or negative torque about an axis in each of three dimensions.

20. The system of claim 1, wherein the controller is configured to direct the extender to move and apply the coating composition to the test bed according to the pre-programmed movement routine and based on information received from the sensor.

21. The system of claim 1, wherein the analyzer is configured to record at least one of user-inputted data and coating composition data.

* * * * *